United States Patent
Pautis et al.

(10) Patent No.: US 10,519,899 B2
(45) Date of Patent: Dec. 31, 2019

(54) THRUST REVERSER SYSTEM LIMITING AERODYNAMIC PERTURBATION IN AN INACTIVE CONFIGURATION

(71) Applicant: Airbus Operations (SAS), Toulouse (FR)

(72) Inventors: Olivier Pautis, Merville (FR); Jerome Colmagro, Toulouse (FR)

(73) Assignee: Airbus Operations (SAS), Toulouse (FR)

( * ) Notice: Subject to any disclaimer, the term of this patent is extended or adjusted under 35 U.S.C. 154(b) by 330 days.

(21) Appl. No.: 15/693,735

(22) Filed: Sep. 1, 2017

(65) Prior Publication Data

US 2018/0066606 A1 Mar. 8, 2018

(30) Foreign Application Priority Data

Sep. 5, 2016 (FR) ...................................... 16 58213

(51) Int. Cl.
*F02K 1/72* (2006.01)
*F02K 1/76* (2006.01)

(52) U.S. Cl.
CPC ................ *F02K 1/72* (2013.01); *F02K 1/763* (2013.01)

(58) Field of Classification Search
CPC ... F02K 1/62; F02K 1/625; F02K 1/70; F02K 1/72; F02K 1/763
See application file for complete search history.

(56) References Cited

U.S. PATENT DOCUMENTS

| | | | |
|---|---|---|---|
| 3,981,451 A * | 9/1976 | Prior | F02K 1/72 239/265.31 |
| 10,378,479 B2 * | 8/2019 | Franer | F02K 1/09 |
| 2009/0321561 A1 | 12/2009 | Andre et al. | |
| 2016/0025037 A1 * | 1/2016 | Teia Dos Santos Mendes Gomes | F02K 1/72 415/1 |
| 2017/0043878 A1 | 2/2017 | Pautis et al. | |
| 2017/0240288 A1 | 8/2017 | Pautis et al. | |

FOREIGN PATENT DOCUMENTS

| | | |
|---|---|---|
| DE | 102013206595 | 10/2014 |
| EP | 2921685 | 9/2015 |
| FR | 2935354 | 2/2008 |
| FR | 2935444 | 2/2008 |

OTHER PUBLICATIONS

French Search Report dated May 8, 2017.

* cited by examiner

*Primary Examiner* — Andrew H Nguyen
(74) *Attorney, Agent, or Firm* — Greer, Burns & Crain, Ltd.

(57) ABSTRACT

A thrust reverser system with a thrust reverser cascade and a reverser door with door segments laid out in a folded condition relatively to each other in an inactive configuration of the reverser system, and accommodated in an accommodation space located outside the secondary channel. Upon passing from the inactive configuration to the active configuration a rearward displacement of the cascade towards a nacelle aperture, released by an external movable nacelle cowl driven rearwards by the cascade, and a deployment of segments until they attain a deployed closing position within the secondary channel occurs simultaneously.

15 Claims, 4 Drawing Sheets

THRUST REVERSER SYSTEM LIMITING AERODYNAMIC PERTURBATION IN AN INACTIVE CONFIGURATION

CROSS-REFERENCES TO RELATED APPLICATIONS

This application claims the benefit of the French patent application No. 1658213 filed on Sep. 5, 2016, the entire disclosure of which is incorporated herein by way of reference.

BACKGROUND OF THE INVENTION

The invention relates to the field of thrust reverser systems for aircraft turbomachines.

It relates more specifically to the systems comprising thrust reversal gratings with which the double-flow turbomachines are equipped.

The invention relates also to an aircraft comprising turbomachines equipped with such thrust reverser systems. It applies preferentially to commercial aeroplanes.

Thrust reverser systems are for example known from the documents FR 2 935 444 and FR 2 935 354. Among the different thrust reversal principles implemented on aircraft turbomachines, reversal grating systems are known, that are provided with passages oriented in such a way as to redirect forwards the air originating from the secondary channel, in order to generate the counter-thrust load. The air is forced to be extracted from this secondary channel through reverser gates at least partially blocking this channel, in active configuration of the system.

On the other hand, in inactive configuration, each reverser gate is in retracted position in which it participates in the formation of the outer wall of the secondary channel, also called OFS (Outer Fixed Structure). More specifically, in this inactive configuration of the reverser system, each gate reconstitutes a part of this outer wall of the secondary channel, within a mobile external nacelle fairing enclosing the reversal gate. In the transition from the inactive configuration to the active configuration, the mobile external fairing is displaced backwards by cylinders so as to release the grating, and to bring the reverser gates into their position of blocking of the secondary channel, via appropriate mechanical kinematics.

This principle, although widely used, does nevertheless suffer from a problem of aerodynamic disturbances from the flow of air passing through the secondary channel in inactive configuration of the system. In fact, in this configuration, the flow of air in the secondary channel is disturbed in its passage over the areas of join between the body of the outer mobile fairing, and the reverser gates added to this body. This causes drag and losses of pressure in the secondary channel, which lead to a reduction of the overall performance levels of the turbomachine.

There is therefore a need to optimize the design of these thrust reverser systems, in order to reduce the disturbances of the flow of air in the secondary channel, in inactive configuration of the thrust reverser system.

SUMMARY OF THE INVENTION

To at least partially address this need the subject of the invention is a thrust reverser system for double-flow aircraft turbomachine, the reverser system comprising at least one thrust reversal grating through which is intended to circulate the air from a secondary channel of the turbomachine in active configuration of the reverser system, the latter also comprising at least one reverser gate configured to at least partly block said secondary channel downstream of the thrust reversal grating, when the system is in active configuration.

According to the invention, the reverser gate is produced using at least two gate sections arranged in a state folded back relative to one another in an inactive configuration of the reverser system, and housed in a housing space situated outside of said secondary channel and in which is also located said grating to which at least one of said two gate sections is connected.

Furthermore, the reverser system is configured in such a way that there occurs simultaneously, upon a transition from the inactive configuration to the active configuration:

a backward displacement of the grating towards a nacelle opening, released by a mobile outer nacelle fairing driven backwards by the grating, via at least one of the two gate sections; and a deployment of said two gate sections relative to one another, until they reach a deployed position of blocking in the secondary channel.

The invention thus contrasts with the conventional embodiments of the grating reverser systems, by providing a reverser gate in several sections arranged outside of the secondary channel in inactive configuration of the system, and which are deployed into the annular channel upon the transition to the active configuration. By virtue of this design specific to the present invention, when the system is in inactive configuration, the reverser gates no longer disturb the flow of air passing through the secondary channel of the turbomachine. Advantageously, that makes it possible to improve the overall performance levels of the turbomachine.

The invention also provides at least one of the following optional features, taken alone or in combination.

In its active configuration, the grating is inclined in relation to a longitudinal axis of the turbomachine such that its rear end is housed inside the secondary channel, and the two gate sections protrude from this rear end respectively radially inwards and outwards in the secondary channel.

In active configuration of the system, one of the two gate sections forces the air from the secondary channel to escape through the grating, and the other of the two gate sections prevents the air leaving through the grating from recirculating in said secondary channel, the two gate sections being preferably substantially aligned in the active configuration of the system.

The reverser system preferably comprises:

a first gate section of which one end is articulated on the rear end of the grating, and of which an opposite end is secured to a first end of a first link piece, of which the opposite second end is articulated inside said mobile outer nacelle fairing, the first gate section and the first link piece being preferentially produced of a single piece;

a second gate section of which one end is articulated on the rear end of the grating, and of which an opposite end is secured to a first end of a second link piece, of which the opposite second end is intended to be articulated on an inner wall of the secondary channel, also called IFS (Inner Fixed Structure), the second gate section and the second link piece being preferentially produced of a single piece.

As an example, the first link piece is generally U or cap-shaped, and the second link piece is a connecting rod. Other shapes are nevertheless possible, without departing from the scope of the invention.

In inactive configuration of the system, the second link piece is arranged substantially radially in the secondary channel, and preferably intended to be masked from a secondary flow of air by an arm of an intermediate turbomachine housing, preferably an output-directing blade ring and even more preferentially such a blade ring with an additional structural function. In addition, in active configuration, said second link piece is arranged locally substantially parallel to the internal wall of the secondary turbomachine channel.

In longitudinal cross section, the assembly formed by the first gate section and the first link piece is globally L-shaped, and the assembly formed by the second gate section and the second link piece is also globally L-shaped.

In longitudinal cross section, the assembly formed by the grating and the first and second sections is globally Y-shaped in inactive configuration, and T-shaped in active configuration.

The reverser system comprises at least one cylinder for moving the grating, forwards and backwards, the cylinder comprising a cylinder rod preferably articulated on a front end of the grating, and it also comprises at least one guiding rail for the grating intended to be secured to a housing of the turbomachine, and preferably several rails cooperating with a front end of the grating.

Said housing space is an internal space of the nacelle.

In its inactive configuration, the grating is situated at least partly radially facing a fan housing of the turbomachine.

The reverser system comprises several gratings that are adjacent in the tangential direction of the turbomachine, preferably so as to form a set of gratings extending over substantially 360° about a longitudinal axis of the turbomachine, and each grating is associated with a reverser gate.

Finally, the gratings are linked mechanically to one another such that the number of cylinders is preferentially less than the number of gratings. Nevertheless, these two numbers could be identical, without departing from the scope of the invention.

Also, a subject of the invention is a double-flow aircraft turbomachine comprising a thrust reverser system as described above, as well as an aircraft comprising at least one such turbomachine.

Other advantages and features of the invention will become apparent from the nonlimiting detailed description below.

BRIEF DESCRIPTION OF THE DRAWINGS

This description will be given in light of the attached drawings in which.

DETAILED DESCRIPTION OF PREFERRED EMBODIMENTS

Figure 1:
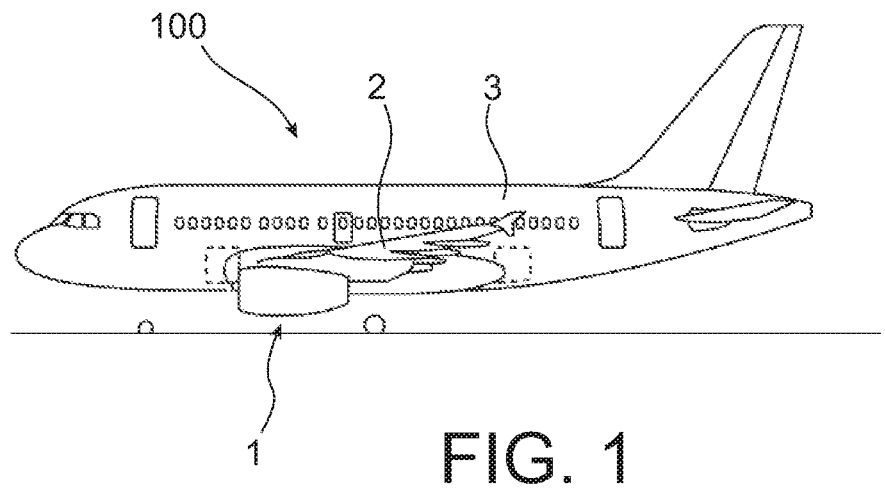
FIG. 1 represents a side view of an aircraft comprising a turbomachine equipped with a thrust reverser system according to the invention.

Referring to FIG. 1, an aircraft 100 is represented of the commercial aeroplane type, comprising two wings 2 (just one visible in FIG. 1) fixed to a fuselage 3 and each bearing a turbomachine 1 of the double-flow type, such as a jet engine.

A preferred embodiment of the turbomachine 1 will now be described with reference to FIGS. 2 to 4. Throughout the following description, by convention, the direction X corresponds to the longitudinal direction of the turbomachine, this direction being parallel to the longitudinal axis 6 of this turbomachine. Also, the direction Y corresponds to the direction oriented transversely in relation to the turbomachine, and the direction Z corresponds to the vertical or height direction, these three directions X, Y, Z being mutually orthogonal.

Figure 4:
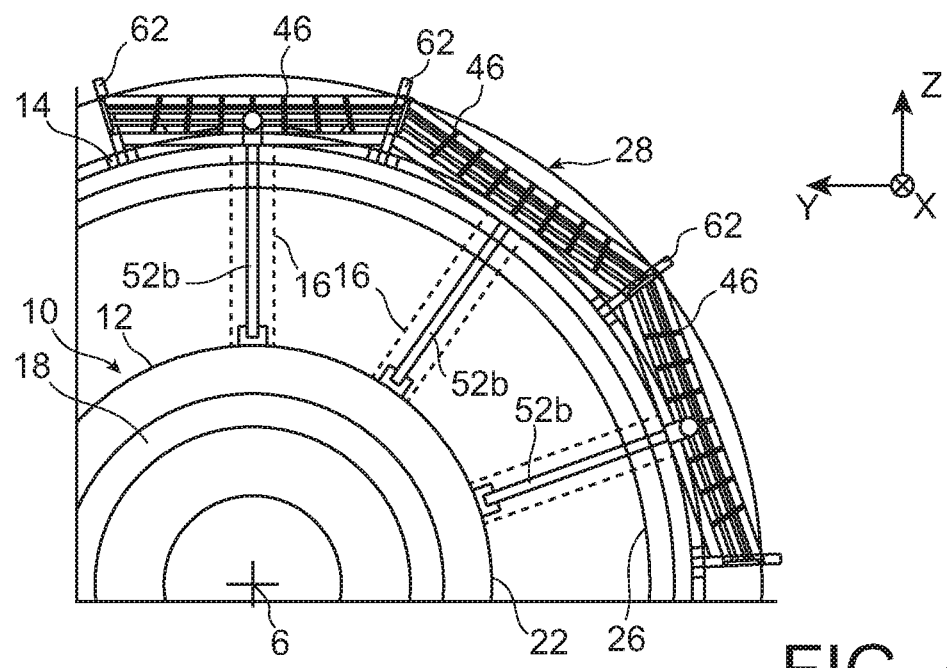
FIG. 4 represents a view in transverse cross section of the turbomachine shown in FIGS. 2 and 3.

Conventionally, the turbomachine 1 comprises a fan housing 8 centered on the axis 6 and prolonged by an intermediate housing 10, formed by a hub 12 and an outer shell 14 linked to this hub using arms 16 represented schematically in FIG. 4. The arms 16 extend substantially radially, and constitute, at least for some of them, output-directing blade rings, also called OGV (Outlet Guide Vane). Preferably, at least some of these arms 16 are structural as well as being aerodynamically profiled. The hub 12 is prolonged backwards by a central housing also called core housing, reference 18 in FIG. 4 and enclosing the core of the turbomachine. Around the central housing, there is an inter-stream compartment 20 delimited by a fixed inner fairing 22, also called IFS. This is more specifically an internal wall 22 delimiting a secondary annular channel 24 of the turbomachine. This channel 24 is delimited at the front by the fan housing 8 and by the intermediate housing, then being prolonged backwards by therefore being delimited internally by the wall 22, and externally by an outer wall of the secondary channel 26. The latter is incorporated in a mobile outer nacelle fairing 28. In effect, the turbomachine 1 also comprises a nacelle 30, of which a front part is produced by hollow covers 32 surrounding the fan housing 8 and the outer shell 14 of the intermediate housing. These covers 32 are generally called fan covers. They are mounted articulated so as to allow access to the operators, for the performance of maintenance operations. The covers 32 are prolonged backwards by the abovementioned mobile outer fairing 28, the latter being in fact able to be translated forwards and backwards relative to the nacelle covers 32, along the longitudinal axis 6. In this respect, note that, throughout the description, the terms "forwards" and "backwards" are considered in relation to the direction of advance of the aircraft as a result of the thrust from its turbomachines, this direction of advance being represented by the arrow 34.

Figure 2:
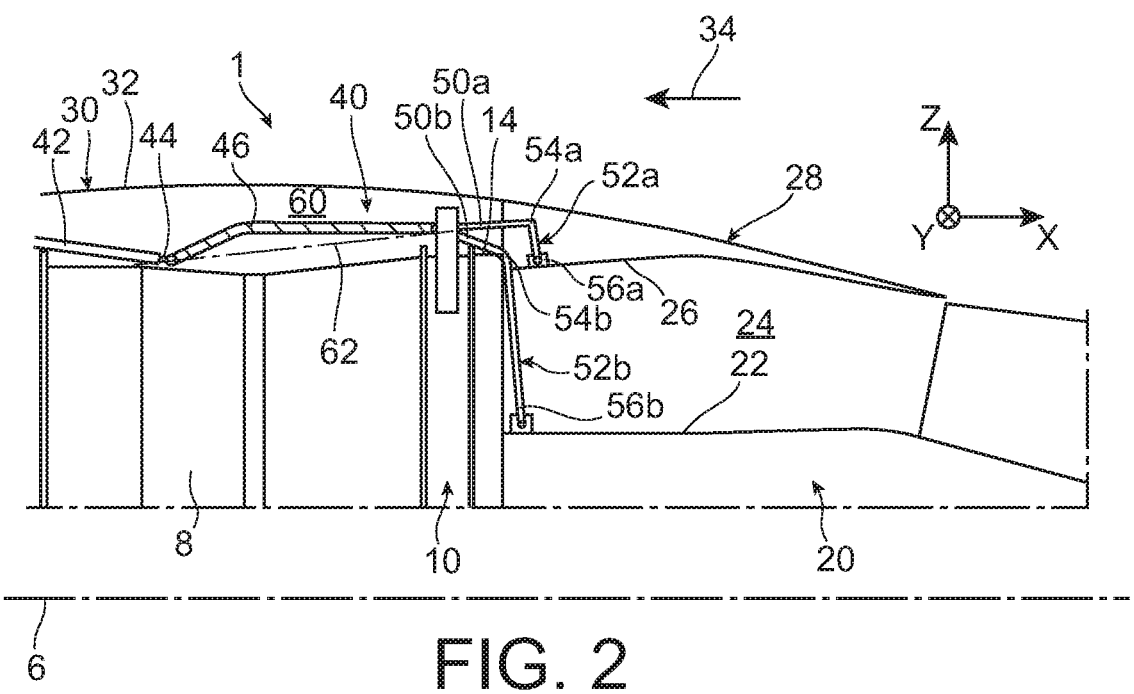
FIG. 2 represents a partial view in longitudinal cross section of the turbomachine shown in the preceding figure, with its thrust reverser system in inactive configuration.
Figure 3:
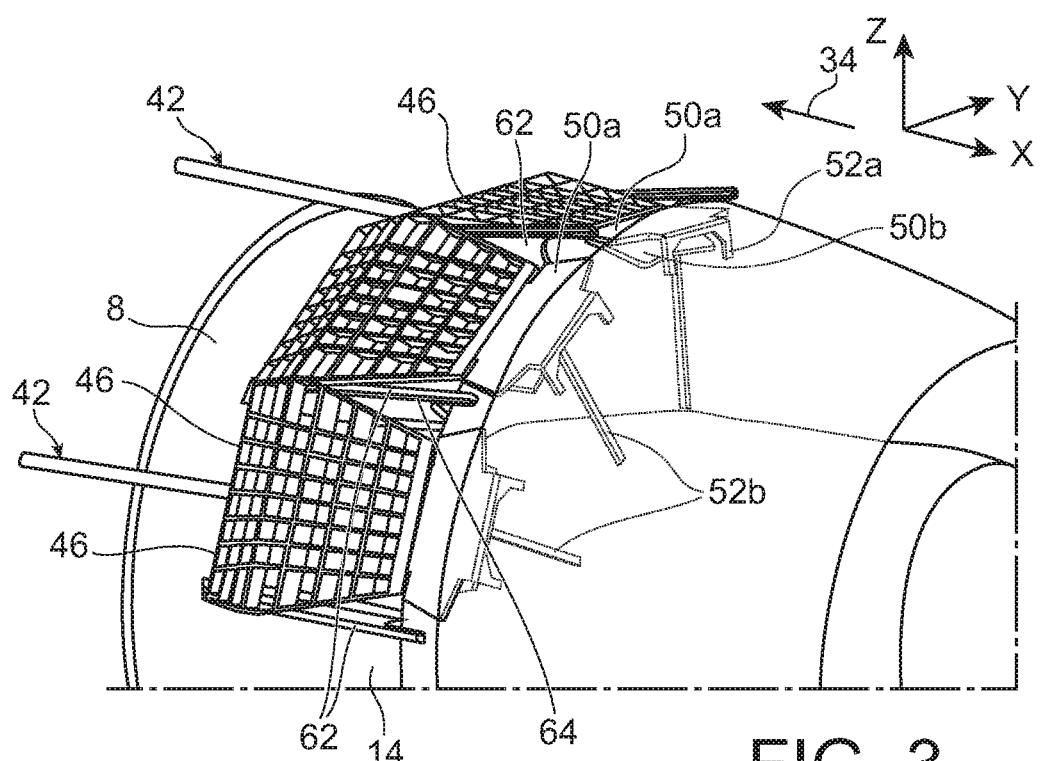
FIG. 3 represents a partial perspective view of the turbomachine shown in the preceding figure.

In this environment, a thrust reverser system 40 specific to the present invention is incorporated, and of which an embodiment will now be described in its inactive configuration, as represented in FIGS. 2 to 4.

First of all, it is noted that the reverser system 40 is produced from several modules which are repeated and which are arranged to be adjacent in the tangential direction of the turbomachine, all about the axis 6. At least some of these modules each comprise, in the front part, a cylinder 42 of which a front end is mounted for example articulated on the front end of the fan housing 8. The cylinder 42 comprises a cylinder rod 44 which is mounted in an articulated manner at its front end to a thrust reversal grating 46. In inactive configuration, the grating 46 is situated radially outwards, facing the fan housing 8 and the outer shell 14 of the intermediate housing. Consequently, in this configuration, the grating is situated forward relative to the mobile outer fairing 28, and therefore does not penetrate into the latter. The grating 46 and the cylinder 42 are consequently located in an advanced position of the nacelle, level with the fan caps, which have a diameter which is usually greater than that of the tapered rear part of the nacelle, which makes it possible to benefit from more space for their integration. The result thereof is advantageously a nacelle 30 of reduced outer diameter.

The reversal grating 46 can be of conventional planar form, or else have two sections substantially inclined relative to one another, as is shown in the cross section of FIG. 2. It conventionally comprises orifices through which the air from the secondary channel 24 is intended to circulate, when the reverser system 40 is in active configuration.

To the rear of the grating, the reverser system 40 comprises two reverser gate sections, intended to reconstitute and thus form together the reverser gate, when the system adopts its active configuration as will be described hereinbelow.

There is a first gate section 50a, of which a front end is articulated on the rear end of the grating 46. This first gate section 50a is substantially planar, and substantially parallel to the longitudinal axis 6 by extending to a rear end secured to a first link piece 52a. More specifically, the rear end of the first gate section 50a is secured to a top end 54a of the first link piece 52a, the latter having an opposite second end 56a, called inner end, articulated on the mobile outer fairing 28.

In effect, the fairing 28 has a forward-opening hollow body, which is partly defined by the internal wall 26 of the secondary channel 24. It is to this wall 26, inside the hollow that it defines, that the end 56a of the first link piece 52a is mounted articulated. This first link piece 52a is produced of a single piece with the first gate section 50a, for which it fulfills a rocker function, as will be described hereinbelow. In longitudinal cross section as shown in FIG. 2, the assembly formed by these two elements 50a, 52a is generally in the form of a recumbent L, with the base of the L oriented radially inwards. As can be seen better in FIG. 3, the link piece 52a is generally U or cap-shaped, of a width less than that of the gate section 50a.

Thus, in inactive configuration of the reverser system 40, the first gate section 50a and the first link piece 52a are both arranged in a housing space 60, defined by the nacelle outside of the secondary channel 24, in the specific thickness of the nacelle. The secondary channel 24 is not therefore disturbed by the presence of these elements 50a, 52a, and the outer wall 26 delimiting the secondary channel 24 can therefore be continuous, for example by being produced of a single piece.

The housing space 60 is partly defined by the hollow of the fan covers 32, and by the hollow of the mobile outer fairing 28 situated in the axial continuity of the hollow of the fan covers 32. In inactive configuration, the grating 46 is also in this housing space 60, just like the cylinder 42.

Moreover, the second gate section 50b, of which a front end is also articulated on the rear end of the grating 46, is substantially planar and slightly inclined in relation to the longitudinal axis 6. It extends to a rear end secured to a second link piece 52b. More specifically, the rear end of the second gate section 50b is secured to a top end 54b of the second link piece 52b, the latter having an opposite second end 56b, called inner end, articulated on the fixed internal wall 22.

The second link piece 52b is produced of a single piece with the second gate section 50b, for which it fulfills a rocker function, as will also be described hereinbelow. In longitudinal cross section as shown in FIG. 2, the assembly formed by these two elements 50b, 52b takes the general form of an overturned L, with the base of the L oriented forwards. As can be seen better in FIG. 3, the second link piece 52b is generally of connecting rod form, connected so as to be centered on the second gate section 50b.

Thus, in inactive configuration of the reverser system 40, the second gate section 50b is arranged in the housing space 60 defined by the nacelle, outside of the secondary channel 24. The second link piece 52b, for its part, is arranged substantially radially in the secondary channel 24, in close proximity to the intermediate housing 10. It is in fact masked from the secondary flow of air passing through the channel 24, by one of the structural aerodynamic arms 16 of this housing 10, as is shown in FIG. 4. Consequently, because of its particular position in the continuity of one of these arms 16, the second link piece 52b generates only very little disturbance to the secondary flow of air.

Furthermore, note that all of the articulated elements of the kinematic chain described above have articulation axes oriented substantially in the tangential direction of the turbomachine.

In the inactive configuration of the reverser system, the two gate sections 50a, 50b are therefore arranged outside of the secondary channel 24, in a state folded back relative to one another. This state corresponds to a jack knife folded position, in which they are inclined by a small angle relative to one another. They are arranged in the backward continuity of the grating 46, also situated in the housing space 60 of the nacelle, such that, in inactive configuration, these three elements 46, 50a, 50b take the general form of a recumbent Y.

As can be seen better in FIG. 3, the fan housing 8 is equipped with longitudinal rails 62 used to guide the front end of the grating 46. To do this, this front grating end can be equipped with rollers capable of sliding in a groove 64 of each rail 62. In this respect, it is specified that the modules of the reverser system can be linked to one another at these rollers (not represented), each of them in fact being able to form part of mechanical link means provided between the gratings 46 that are directly consecutive in the tangential direction. These gratings are moreover provided in a sufficient number for them to form an assembly extending over substantially 360° all about the longitudinal axis 6 of the turbomachine. As an exemplary indication, there can for example be a number of gratings of between 6 and 12. The same applies for the reverser gates, which are intended to block substantially 360° of the secondary channel in active configuration of the reverser system.

In this particular case, since the gratings 46 are fixed to one another, it is not necessary to provide a cylinder 42 for each module, so that the number of these cylinders 42 can be less than the number of gratings. As an example, one cylinder 42 is provided for every two gratings 46 along the tangential direction.

The rails 62, for their part, are disposed between the modules, which therefore each comprise a grating 46 and a single reverser gate formed by the two sections 50a, 50b, the angular extent of which is substantially identical to that of the grating.

One of the particular features of the invention lies in the fact that the actuation of the cylinders 42 brings about the movement of all of the parts of the thrust reverser system, without it being necessary to provide additional actuation means. This particular so-called "in-line" disposition makes it possible to benefit from a design simplicity, which also limits the overall weight of the turbomachine.

Figure 5:
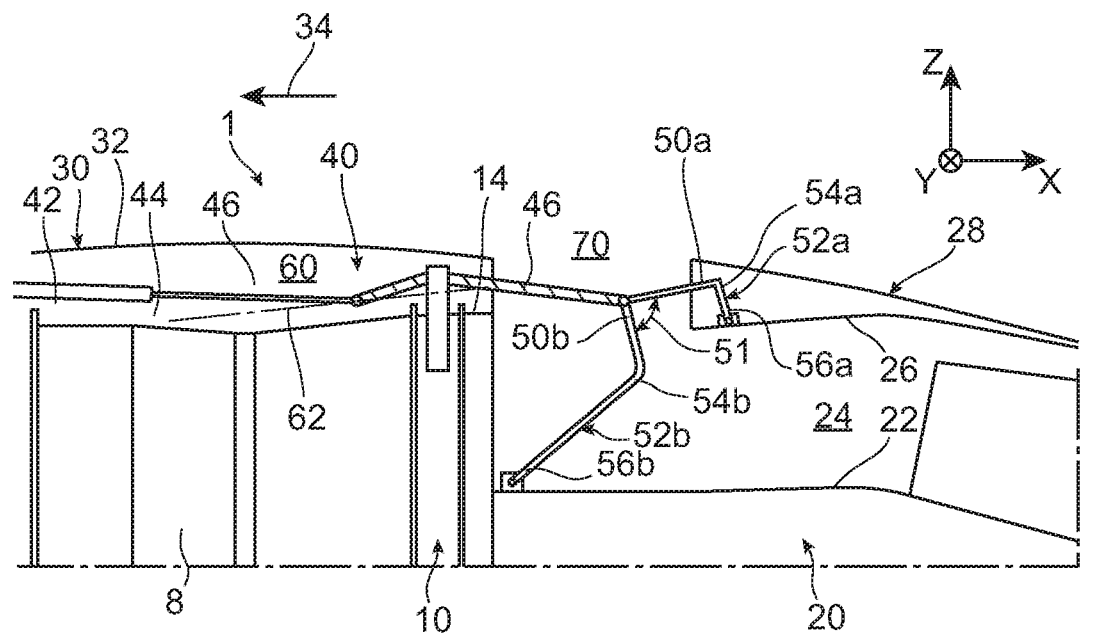
FIG. 5 represents a view similar to that of FIG. 2, during a transition from an inactive configuration to an active configuration of the thrust reverser system.

In operation, when each cylinder 42 is actuated so as to switch from the inactive configuration to the active configuration, the cylinder rod 44 is extracted backwards as is represented in FIG. 5 showing an intermediate configuration between the inactive configuration and the active configuration.

The output of the cylinder rod 44 first of all provokes the backward displacement of the grating 46 guided by the rails (not represented in FIG. 5). This backward movement is transmitted to the mobile outer fairing 28 via the first gate section 50a, and by the first link piece 52a. During these backward displacements, the two link pieces 52a, 52b fulfill their rocker function and pivotingly drive the rear end of the grating 46 radially inwards, into the secondary annular channel 24. This grating 46 therefore undergoes a longitudinal backward displacement under the effect of the action of the cylinder 42, but also dips radially inwards towards the inner wall 22 of the secondary channel 24. By being displaced backwards, the grating 46 penetrates progressively into a nacelle opening 70 which is progressively released by the mobile outer fairing 28, also moving backwards. More specifically, this opening 70 is defined between the front end of this fairing 28, and the rear end of the fan covers 32.

Furthermore, the link parts 52a, 52b also have the effect, because of their rocker function, of deploying the two gate sections 50a, 50b such that the angle 51 that they form increases, as is shown in FIG. 5.

Figure 6:
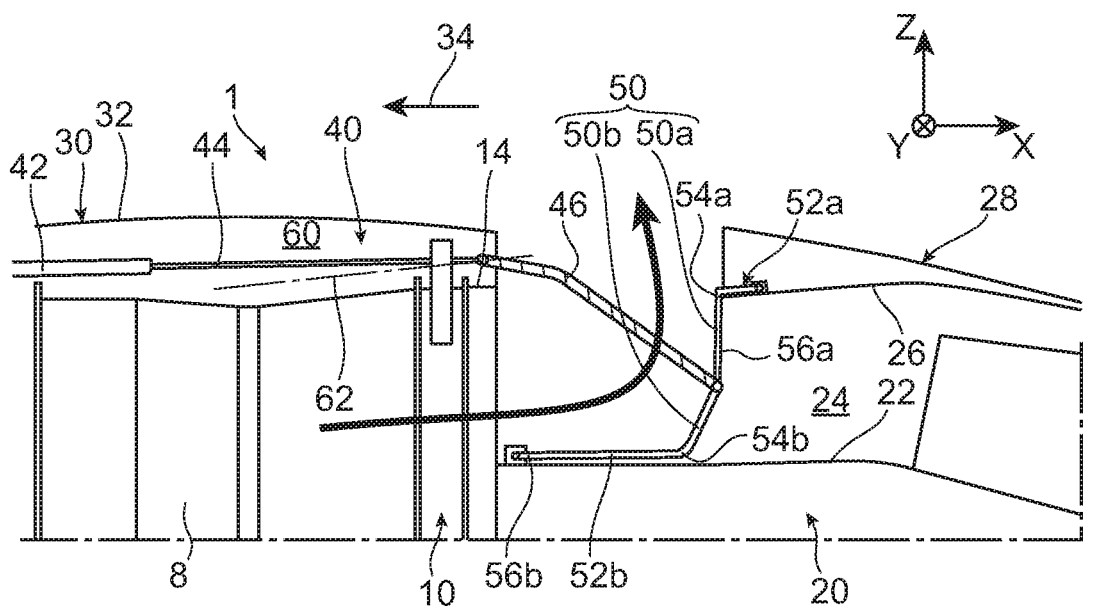
FIGS. 6 to 8 represent views similar to those of FIGS. 2 to 4, with the thrust reverser system in the active configuration.
Figure 7:
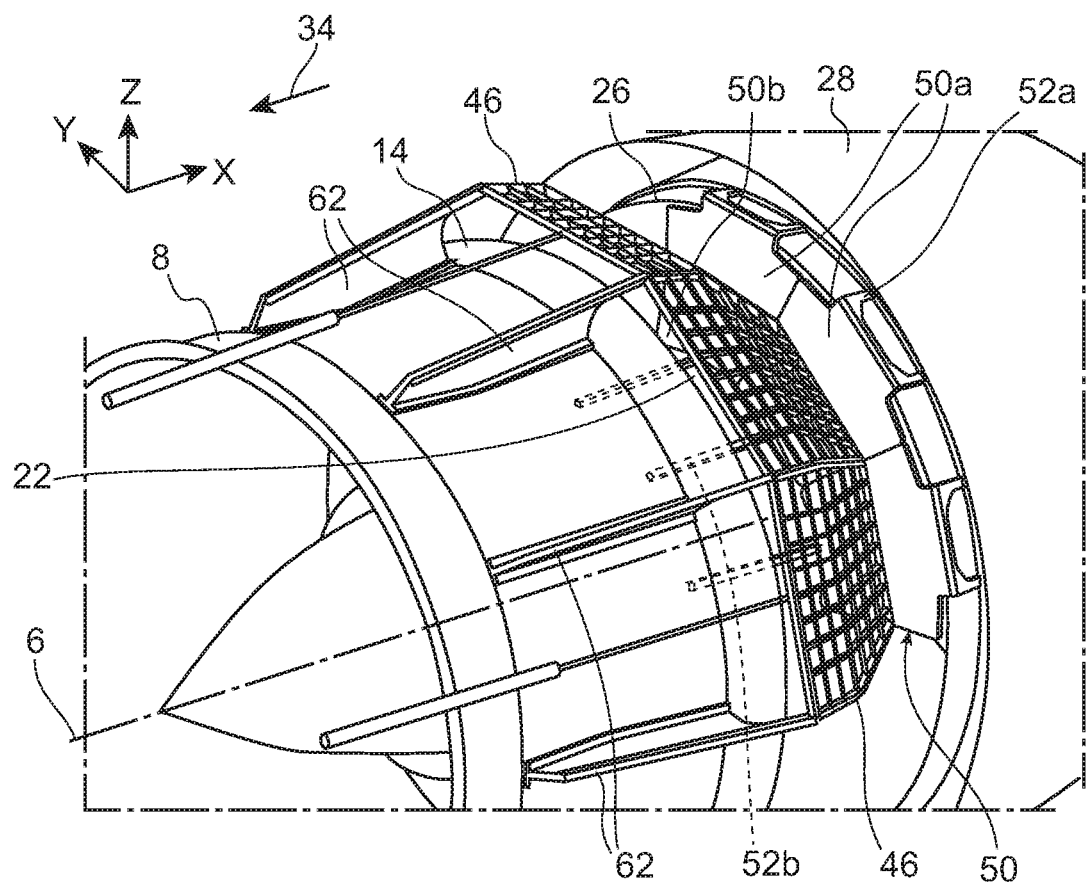
Figure 8:
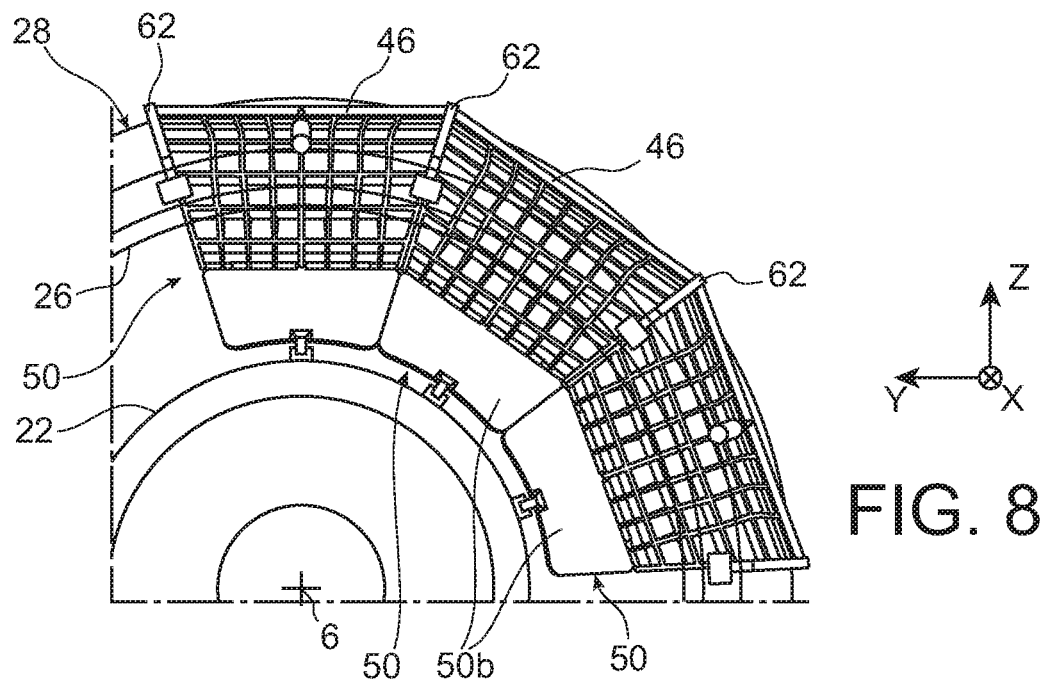

When the cylinder rod 44 is entirely deployed, the active configuration of the reversal system 40 is reached, and the two gate sections 50a, 50b then adopt a deployed position in which the reverser gate 50 is reconstituted so as to block the secondary channel 24, as is shown in FIGS. 6 to 8.

In this configuration, the grating 46 and the two gate sections 50a, 50b adopt a generally recumbent T form, since the two gate sections 50a, 50b are preferably substantially aligned relative to one another. Nevertheless, as is shown in FIG. 6, a small angle may remain between the two gate sections 50a, 50b, for example an angle less than 15°. Note that other relative dispositions could be adopted in the active configuration of the reverser system, for example by providing for the two gate sections 50a, 50b to form a forward-open V.

The second section 50b here fulfills a barrier function aiming to force the air leaving the secondary channel 24 through the intermediate housing, to escape necessarily through the grating 46, without being able to flow further downstream in this secondary channel 24. The second section 50b protrudes radially inwards from the rear end of the grating 46, inclined in relation to the longitudinal axis 6, for example by an angle of between 30 and 60°.

In this configuration, the second link element 52b is substantially parallel and pressed against the internal wall 22 of the secondary channel, such that the disturbances of the secondary flow provoked by these link pieces 52b are minor Also, the first link piece 52a is pressed against the mobile outer wall 26, inside the fairing 28. The two link pieces 52a, 52b are thus substantially parallel to the axis 6, whereas the two sections 50a, 50b are substantially aligned and orthogonal to this same axis 6.

The first gate section 50a, for its part, fulfills not only a function of guiding the air after its exit through the grating 46, but also a function aiming to prevent the air exiting through this grating from recirculating in the secondary channel 24. It in fact forms a barrier linking the rear end of the grating 46 to the fairing 28 in retracted position. Thus, as is schematically represented in FIG. 6, the air of the secondary flow leaving the intermediate housing 10 is forced by the second gate sections 50b to use the orifices of the grating 46, so that the secondary flow of air is reversed. The air leaving the grating is, for its part, prevented from returning to the secondary channel 24, because of the presence of the first gate section 50a which, for its part, extends radially outward from the rear end of the grating 46.

Preferably, the rear end of the grating 46 is situated substantially centered in the secondary annular channel 24, in the radial direction. Nevertheless, depending on the needs encountered, this rear end could be closer to the outer wall 26 or else, alternatively, closer to the internal wall 22 of the secondary channel 24, without departing from the scope of the invention.

Obviously, various modifications can be made by a person skilled in the art to the invention which has just been described, purely by way of nonlimiting examples. As an indicative example, the particular kinematics described above could be modified by providing for only the first gate section 50a to be articulated on the rear end of the grating, and with the second gate section 50b articulated on this same first section 50a.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A thrust reverser system for a double-flow aircraft turbomachine, the thrust reverser system comprising:
at least one thrust reversal grating through which air from a secondary channel of the turbomachine circulates in an active configuration of the thrust reverser system,
at least one reverser gate configured to at least partly block said secondary channel downstream of the at least one thrust reversal grating when the system is in the active configuration, wherein the at least one reverser gate is produced using at least two gate sections arranged in a state folded back relative to one another in an inactive configuration of the reverser system and housed in a housing space situated outside of said secondary channel and in which is also located said at least one thrust reversal grating to which at least one of said at least two gate sections is connected,
wherein the thrust reverser system is configured in such a way that there occurs simultaneously, upon a transition from the inactive configuration to the active configuration:
a backward displacement of the at least one thrust reversal grating towards a nacelle opening, released by a mobile outer nacelle fairing driven backwards by the at least one thrust reversal grating via the at least one of said at least two gate sections; and a deployment of said at least two gate sections relative to one another, until said at least two gate sections reach a deployed position of blocking in the secondary channel.

2. The thrust reverser system according to claim 1, wherein, in the active configuration, the at least one thrust reversal grating is inclined in relation to a longitudinal axis of the turbomachine such that a rear end of the at least one thrust reversal grating is housed inside the secondary channel, and the at least two gate sections protrude from the rear end of the at least one thrust reversal grating respectively radially inwards and outwards in the secondary channel.

3. The thrust reverser system according to claim 2, wherein, in the active configuration of the thrust reverser system, one of the at least two gate sections forces air from the secondary channel to escape through the at least one thrust reversal grating, and the other of the at least two gate sections prevents air leaving through the at least one thrust reversal grating from recirculating in said secondary channel, the at least two gate sections being substantially aligned in the active configuration of the thrust reverser system.

4. The thrust reverser system according to claim 1, wherein the at least two gate sections comprise:
a first gate section with one end articulated on a rear end of the at least one thrust reversal grating, and an opposite, second end secured to a first end of a first link piece, wherein the opposite, second end is articulated inside said mobile outer nacelle fairing, the first gate section and the first link piece being produced of a single piece; and,
a second gate section with one end articulated on the rear end of the at least one thrust reversal grating, and an opposite, second end secured to a first end of a second link piece, wherein the opposite, second end of the second gate section is configured to be articulated on an internal wall of the secondary channel, the second gate section and the second link piece being produced of a single piece.

5. The thrust reverser system according to claim 4, wherein the first link piece is generally U or cap-shaped, and the second link piece is a connecting rod.

6. The thrust reverser system according to claim 4, wherein, in the inactive configuration of the thrust reverser system, the second link piece is arranged substantially radially in the secondary channel, and masked from a secondary flow of air by an arm of an intermediate turbomachine housing, and in that, in the active configuration, said second link piece is arranged locally substantially parallel to the internal wall of the secondary channel.

7. The thrust reverser system according to claim 4, wherein, in longitudinal cross section, an assembly formed by the first gate section and the first link piece is globally L-shaped, and a second assembly formed by the second gate section and the second link piece is globally L-shaped.

8. The thrust reverser system according to claim 4, wherein, in longitudinal cross section, an assembly formed by the at least one thrust reversal grating and the first and second gate sections is globally Y-shaped in the inactive configuration, and T-shaped in the active configuration.

9. The thrust reverser system according to claim 1 further comprising:
at least one cylinder configured to move the at least one thrust reversal grating forwards and backwards, the at least one cylinder comprising a cylinder rod articulated on a front end of the at least one thrust reversal grating; and,
at least one guiding rail for the at least one thrust reversal grating secured to a housing of the turbomachine, and several rails cooperating with a front end of the at least one thrust reversal grating.

10. The thrust reverser system according to claim 1, wherein said housing space is an internal space of a nacelle.

11. The thrust reverser system according to claim 1, wherein, in its inactive configuration, the at least one thrust reversal grating is situated at least partly radially facing a fan housing of the turbomachine.

12. The thrust reverser system according to claim 1, wherein the at least one thrust reversal grating comprises several gratings that are adjacent in the tangential direction of the turbomachine, so as to form a set of gratings extending over substantially 360° about a longitudinal axis of the turbomachine, wherein each grating of the several gratings is associated with a respective reverser gate of the at least one reverser gate.

13. The thrust reverser system according to claim 12 further comprising:
at least one cylinder configured to move the at least one thrust reversal grating forwards and backwards, the at least one cylinder comprising a cylinder rod articulated on a front end of the at least one thrust reversal grating; and,
at least one guiding rail for the at least one thrust reversal grating secured to a housing of the turbomachine, and several rails cooperating with a front end of the at least one thrust reversal grating, and,
wherein the several gratings are linked mechanically to one another such that a number of cylinders of the at least one cylinder is less than a number of the several gratings.

14. A double-flow aircraft turbomachine comprising a thrust reverser system according to claim 1.

15. An aircraft comprising at least one turbomachine according to claim 14.

* * * * *